July 27, 1926.  1,594,233

H. ZOELLY

POWER DRIVEN VEHICLE

Filed Dec. 15, 1923

Inventor
Heinrich Zoelly,
By
Atty.

Patented July 27, 1926.

1,594,233

UNITED STATES PATENT OFFICE.

HEINRICH ZOELLY, OF ZURICH, SWITZERLAND.

POWER-DRIVEN VEHICLE.

Application filed December 15, 1923, Serial No. 680,930, and in Switzerland December 22, 1922.

The present invention relates to power driven vehicles provided with two frames and spring arrangements interposed between the frames, one of the frames carrying the wheel axles and the other the body of the vehicle, and it has for its object to provide a vehicle in which a soft running that is free of shocks when travelling over uneven and rough roads may be attained.

The hitherto known vehicles of the above type have not been provided with more than two axles for the wheels so that a wheel which happened to be over a depression of the ground or a hole in the road has been pressed downwards into the depression owing to the action of the springs and by the relative movability of the two frames, whereby a more or less heavy shock resulted by the subsequent bumping of the wheel against the rising part of the depression. The shocks are the heavier when the driving motor is mounted on the frame carrying the wheel axles. It is true that vehicles having only one frame and provided with more than four wheels are already known, such vehicles being also provided with means preventing beyond a certain limit the release of the springs supporting the frame, so that the wheels are not pressed into the depressions in the road.

However, as these vehicles have only one heavy frame more or less heavy shocks occur, and they have the additional disadvantage that the mounting of the axles is complicated. The present invention overcomes all the aforementioned drawbacks by utilizing a combination of two known features. According to the invention the comparatively light frame carrying the axles is provided with at least three axles rigidly mounted on it and the driving device of the vehicle is arranged on the second frame resiliently connected in the vertical direction with the other frame.

In order to provide for a quick and soft negotiation of curves, besides the springs acting in the vertical direction springs acting in the horizontal direction may be interposed between the two frames.

Constructional examples of the subject matter of the invention are illustrated on the accompanying drawing, in which.

Figure 1:
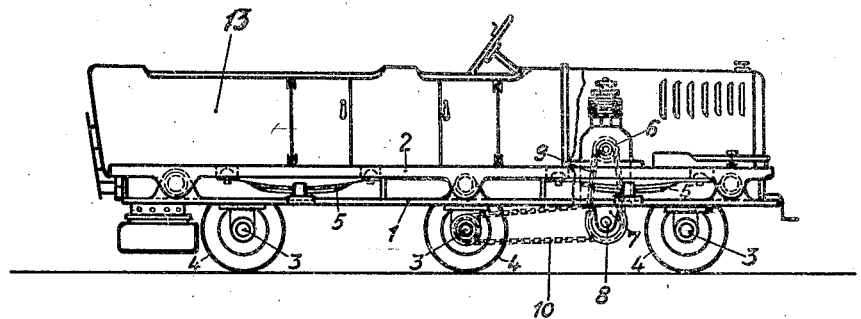
Fig 1 is a side elevation of a first embodiment.
Figure 2:
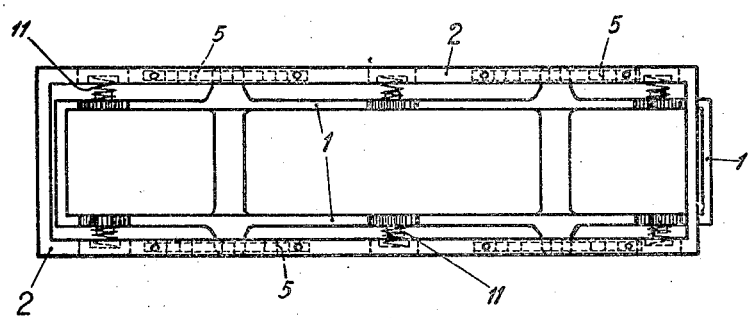
Fig. 2 is a corresponding plan view, the wheels and the driving mechanism being omitted for the sake of clearness.

The vehicle shown in Figs. 1 and 2 is provided with two frames 1 and 2. On the frame 1 three wheel axles 3 are rigidly mounted, each of which being fitted with two wheels 4. The frame 1 is comparatively light. The frame 2 is cushioned against the frame 1 by means of springs 5 acting in the vertical direction and by means of springs 11 (Fig. 2) interposed between the frames 1 and 2, and acting in the horizontal direction. The frame 2 supports the driving motor 6 and the vehicle body 13. To the frame 2 brackets 7 are fixed (only one bracket being shown in the drawing), in which an intermediate shaft 8 is mounted. The power of the motor 6 is transmitted by a chain drive 9 to the shaft 8 and from there to the intermediate wheel axle 3 by a chain drive 10. The frame 2 thus supports the largest part of the device serving to drive the vehicle. The front axle 3, and when necessary also the rear axle may be built in a well known manner as steering axles.

When the described vehicle travels over a depression in the ground, the wheel 4 coming above that depression cannot drop down into the depression as its axle 3 is rigidly mounted in the frame 1 that is supported by the wheels on five other points of the road. Shocks are thereby prevented which would doubtless occur if a wheel that has dropped into the depression bumps against the rising part of the depression. The increased load occurring when travelling over a depression and acting on the other wheels 4 which are on even ground, is taken up by the springs 5 which also take up the shocks imparted to the frame 1 when the vehicle travels over elevations of the ground, stones and the like. The springs 11 acting in the horizontal direction enable a quick and soft negotiation of curves inasmuch as oscillations, skidding movements, shocks and the like are primarily taken up by the frame 1 and are transmitted in a reduced manner by the springs 11 to the frame 2.

Figure 3:
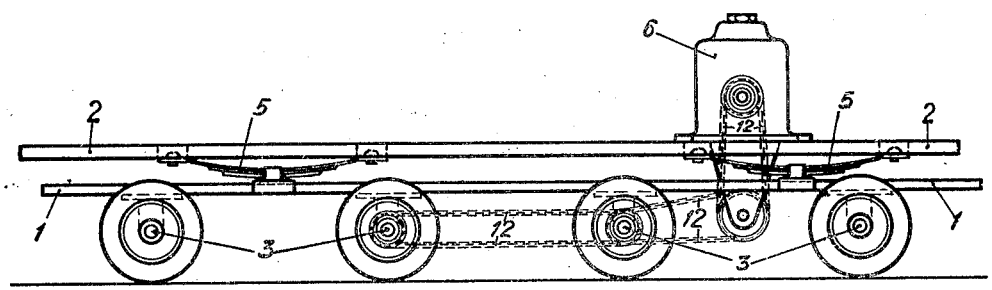
Fig. 3 is a side view of a modification, also illustrating only the parts necessary for the understanding of the invention.

As shown in Fig. 3, the invention may also be applied to vehicles having more than three axles. This Fig. 3 shows a vehicle having four axles 3, of which two are driving axles receiving their drive from the motor 6 by chains 12. In Fig. 3 only the springs 5 acting in vertical direction are illustrated whilst the springs acting in horizontal direction are omitted for clearness sake.

To the essence of the invention it is of no importance whether one or more axles are driven by the motor, or are built as steering axles, or which type of transmission means in the drive is adopted.

I claim:

1. A power-driven vehicle, comprising a rigid lower frame, at least three wheel axles rigidly mounted on said frame, an upper frame carrying the body structure, a device for driving the vehicle arranged on the upper frame, power transmitting means interposed between said device and at least one of said wheel axles, and resilient means connecting the two frames in the vertical direction.

2. A power-driven vehicle, comprising a rigid lower frame, at least three wheel axles rigidly mounted on said frame, an upper frame carrying the body structure, a device for driving the vehicle arranged on the upper frame, power transmitting means interposed between said device and at least one of said wheel axles, resilient means connecting the two frames in the vertical direction, and a second group of resilient means acting in the horizontal direction and interposed between the two frames.

3. A power-driven vehicle comprising a rigid lower frame, at least three axles rigidly mounted on said frame, an upper frame having a greater inertia than the lower frame, springs connecting the frames and resiliently supporting the upper frame on the lower frame, and springs between the frames arranged to cushion the lateral movements of the upper frame with respect to the lower frame.

In testimony whereof I affix my signature.

HEINRICH ZOELLY.